US009068629B2

(12) United States Patent
Sheridan (10) Patent No.: US 9,068,629 B2
(45) Date of Patent: Jun. 30, 2015

(54) FAN DRIVE PLANETARY GEAR SYSTEM INTEGRATED CARRIER AND TORQUE FRAME

(71) Applicant: United Technologies Corporation, Hartford, CT (US)

(72) Inventor: William G. Sheridan, Southington, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/290,576

(22) Filed: May 29, 2014

(65) Prior Publication Data

US 2014/0274531 A1    Sep. 18, 2014

Related U.S. Application Data

(63) Continuation of application No. 13/095,308, filed on Apr. 27, 2011, now Pat. No. 8,777,793.

(51) Int. Cl.
*F16H 1/28* (2006.01)
*F01D 25/16* (2006.01)
*F02C 7/36* (2006.01)
(Continued)

(52) U.S. Cl.
CPC .............. *F16H 1/28* (2013.01); *Y10T 29/49245* (2015.01); *F01D 25/16* (2013.01); *F02C 7/36* (2013.01); *F16C 23/045* (2013.01); *Y02T 50/672* (2013.01); *F16H 57/0427* (2013.01)

(58) Field of Classification Search
USPC .................................. 475/159, 160, 331, 346
See application file for complete search history.

(56) References Cited

U.S. PATENT DOCUMENTS

| 2,281,875 | A | 5/1942 | Gleissner |
| 2,672,726 | A | 3/1954 | Wolf et al. |
| 2,798,360 | A | 7/1957 | Hazen et al. |

(Continued)

FOREIGN PATENT DOCUMENTS

| EP | 1013889 | 8/2005 |
| EP | 2060809 | 2/2011 |
| EP | 2559913 | 2/2013 |

OTHER PUBLICATIONS

U.S. Appl. No. 61/868,120, filed Aug. 21, 2013.

(Continued)

*Primary Examiner* — Justin Holmes
(74) *Attorney, Agent, or Firm* — Carlson, Gaskey & Olds, P.C.

(57) ABSTRACT

A fan gear drive system includes a fan shaft, a turbine shaft, a fixed structure, and a gear train which includes a torque frame that comprises a base with integrated gear shafts that are circumferentially spaced relative to one another. Each shaft provides a shaft axis. Intermediate gears are supported on each bearing assembly for rotation about the bearing axis. A central gear is located radially inward from and intermeshes with the intermediate gears. A ring gear is arranged about and intermeshes with the intermediate gears. One of the torque frame, central gear and ring gear is connected to the fan shaft. Another of the torque frame, central gear and ring gear is connected to the turbine shaft. The remaining of the torque frame, central gear and ring gear is connected to the fixed structure. A bearing assembly is mounted on each of the gear shafts and provides a bearing axis. Each bearing assembly supports the respective intermediate gear.

28 Claims, 6 Drawing Sheets

(51) Int. Cl.
*F16C 23/04* (2006.01)
*F16H 57/04* (2010.01)

(56) References Cited

U.S. PATENT DOCUMENTS

| | | |
|---|---|---|
| 2,850,337 A | 9/1958 | McCallum |
| 3,352,178 A | 11/1967 | Lindgren et al. |
| 3,434,288 A | 3/1969 | Petrie |
| 3,549,272 A | 12/1970 | Bouiller et al. |
| 3,638,428 A | 2/1972 | Shipley et al. |
| 3,673,802 A | 7/1972 | Krebs et al. |
| 3,680,309 A | 8/1972 | Wallace, Jr. |
| 3,727,998 A | 4/1973 | Haworth et al. |
| 3,737,109 A | 6/1973 | Johansson |
| 3,738,719 A | 6/1973 | Langner |
| 3,747,343 A | 7/1973 | Rosen |
| 3,761,042 A | 9/1973 | Denning |
| 3,792,586 A | 2/1974 | Kasmarik et al. |
| 3,896,615 A | 7/1975 | Slatkin et al. |
| 3,925,979 A | 12/1975 | Ziegler |
| 3,971,208 A | 7/1976 | Schwent |
| 4,055,946 A | 11/1977 | Sens |
| 4,084,861 A | 4/1978 | Greenberg et al. |
| 4,251,987 A | 2/1981 | Adamson |
| 4,452,037 A | 6/1984 | Waddington et al. |
| 4,500,143 A | 2/1985 | Kervistin et al. |
| 4,523,864 A | 6/1985 | Walter et al. |
| 4,687,346 A | 8/1987 | Suciu |
| 4,704,862 A | 11/1987 | Dennison et al. |
| 4,727,762 A | 3/1988 | Hayashi |
| 4,782,658 A | 11/1988 | Perry |
| 4,827,712 A | 5/1989 | Coplin |
| 4,867,655 A | 9/1989 | Barbie et al. |
| 4,911,610 A | 3/1990 | Olschewski et al. |
| 4,916,894 A | 4/1990 | Adamson et al. |
| 4,951,461 A | 8/1990 | Butler |
| 4,952,076 A | 8/1990 | Wiley, III et al. |
| 4,981,415 A | 1/1991 | Marmol et al. |
| 5,051,005 A | 9/1991 | Duncan |
| 5,127,794 A | 7/1992 | Burge et al. |
| 5,174,525 A | 12/1992 | Schilling |
| 5,380,155 A | 1/1995 | Varsik et al. |
| 5,410,870 A | 5/1995 | Brauit et al. |
| 5,433,674 A | 7/1995 | Sheridan et al. |
| 5,466,198 A * | 11/1995 | McKibbin et al. ............ 475/346 |
| 5,553,449 A | 9/1996 | Rodgers et al. |
| 5,622,438 A | 4/1997 | Walsh et al. |
| 5,687,561 A | 11/1997 | Newton |
| 5,791,789 A | 8/1998 | Van Duyn et al. |
| 5,806,303 A | 9/1998 | Johnson |
| 5,809,772 A | 9/1998 | Giffin, III et al. |
| 5,860,275 A | 1/1999 | Newton et al. |
| 5,867,980 A | 2/1999 | Bartos |
| 6,082,959 A | 7/2000 | Van Duyn |
| 6,148,518 A | 11/2000 | Weiner et al. |
| 6,158,210 A | 12/2000 | Orlando |
| 6,203,273 B1 | 3/2001 | Weiner et al. |
| 6,338,609 B1 | 1/2002 | Decker et al. |
| 6,439,772 B1 | 8/2002 | Ommundson et al. |
| 6,464,401 B1 | 10/2002 | Allard |
| 6,619,030 B1 | 9/2003 | Seda et al. |
| 6,623,166 B2 | 9/2003 | Andren et al. |
| 6,732,502 B2 | 5/2004 | Seda et al. |
| 6,942,451 B1 | 9/2005 | Alexander et al. |
| 7,004,722 B2 | 2/2006 | Teramura et al. |
| 7,220,057 B2 | 5/2007 | Hoppe |
| 7,412,819 B2 | 8/2008 | Bart et al. |
| 7,487,630 B2 | 2/2009 | Weiler |
| 7,490,460 B2 | 2/2009 | Moniz et al. |
| 7,493,753 B2 | 2/2009 | Moniz et al. |
| 7,500,365 B2 | 3/2009 | Suciu et al. |
| 7,591,594 B2 | 9/2009 | Charier et al. |
| 7,634,916 B2 | 12/2009 | Mace et al. |
| 7,694,505 B2 | 4/2010 | Schilling |
| 7,704,178 B2 | 4/2010 | Sheridan et al. |
| 7,730,715 B2 | 6/2010 | Grudnoski et al. |
| 7,832,193 B2 | 11/2010 | Orlando et al. |
| 7,882,693 B2 | 2/2011 | Schilling |
| 7,883,315 B2 | 2/2011 | Suciu et al. |
| 8,075,261 B2 | 12/2011 | Merry et al. |
| 8,337,149 B1 | 12/2012 | Hasel et al. |
| 8,402,741 B1 | 3/2013 | Merry et al. |
| 8,667,688 B2 | 3/2014 | McCune et al. |
| 2005/0150204 A1 | 7/2005 | Stretton et al. |
| 2005/0265825 A1 | 12/2005 | Lewis |
| 2006/0090451 A1 | 5/2006 | Moniz et al. |
| 2006/0130456 A1 | 6/2006 | Suciu et al. |
| 2006/0196164 A1 | 9/2006 | Donohue |
| 2006/0239845 A1 | 10/2006 | Yamamoto et al. |
| 2007/0084183 A1 | 4/2007 | Moniz et al. |
| 2007/0087892 A1 | 4/2007 | Orlando et al. |
| 2007/0251210 A1 | 11/2007 | Ceric et al. |
| 2008/0053062 A1 | 3/2008 | Tuttle |
| 2008/0098715 A1 | 5/2008 | Orlando et al. |
| 2008/0098717 A1 | 5/2008 | Orlando et al. |
| 2008/0148707 A1 | 6/2008 | Schilling |
| 2008/0155961 A1 | 7/2008 | Johnson |
| 2009/0056306 A1 | 3/2009 | Suciu et al. |
| 2009/0081039 A1 | 3/2009 | McCune et al. |
| 2009/0123271 A1 | 5/2009 | Coffin et al. |
| 2009/0180864 A1 | 7/2009 | Alvanos et al. |
| 2009/0314881 A1 | 12/2009 | Suciu et al. |
| 2010/0058735 A1 | 3/2010 | Hurwitz et al. |
| 2010/0105516 A1 | 4/2010 | Sheridan et al. |
| 2010/0154217 A1 | 6/2010 | Sheridan et al. |
| 2010/0170224 A1 | 7/2010 | Clark et al. |
| 2010/0223903 A1 | 9/2010 | Starr |
| 2011/0047959 A1 | 3/2011 | DiBenedetto |
| 2011/0123326 A1 | 5/2011 | DiBenedetto et al. |
| 2011/0130246 A1 | 6/2011 | McCune et al. |
| 2011/0219781 A1 | 9/2011 | Benjamin et al. |
| 2012/0195753 A1 | 8/2012 | Davis et al. |
| 2012/0257960 A1 | 10/2012 | Reinhardt et al. |
| 2012/0272762 A1 | 11/2012 | Sheridan |
| 2013/0023378 A1 | 1/2013 | McCune et al. |
| 2013/0051984 A1 | 2/2013 | McCune et al. |
| 2013/0319006 A1 | 12/2013 | Parnin et al. |
| 2014/0087907 A1 | 3/2014 | Coffin et al. |

OTHER PUBLICATIONS

Gunston, Bill, "Jane's Aero-Engines," Issue Seven, 2000, pp. 510-512.

Fledderjohn, "The TFE731-5: Evolution of a Decade of Business Jet Service," SAE Technical Paper, Business Aircraft Meeting & Exposition, Apr. 12-15, 1983.

Walsh et al., "Gas Turbine Performance," 1998, 2004, Blackwell Science Ltd., Chapter 5, pp. 159-177.

International Search Report for PCT Application No. PCT/US2013/020462, Jul. 30, 2013.

* cited by examiner

FIG.7

FAN DRIVE PLANETARY GEAR SYSTEM INTEGRATED CARRIER AND TORQUE FRAME

CROSS-REFERENCE TO RELATED APPLICATION

The present disclosure is a continuation of U.S. patent application Ser. No. 13/095,308 filed 27 Apr. 2011.

BACKGROUND

This disclosure relates to a fan drive gear system integrated carrier and torque frame.

One type of gas turbine engine includes a fan drive gear system that is mechanically arranged between the turbo-machinery of the engine and a fan. The turbo-machinery is composed of two concentric shafts rotating at different speeds containing independent compressors and turbines. The turbo-machinery rotationally drives the fan, via the gear system, to move fluid through a nacelle, which divides the fluid flow into two streams. An inner stream supplies the turbo-machinery and the outer stream consists of fluid which bypasses the inner stream and is solely compressed and moved by the fan.

Typically the fan drive gear system is provided by an epicyclic gear train and includes a centrally located input gear driven by the turbo-machinery, intermediate gears circumferentially arranged about and intermeshing with the input gear and a ring gear provided about and intermeshing the intermediate gears. Depending upon the configuration, either the intermediate gears or the ring gear rotationally drives the fan in response to rotation of the input gear.

The intermediate gears are typically supported in a carrier by a journal extending between spaced apart walls of the carrier. The carrier is typically constructed from a high strength metallic alloy such as steel, titanium or nickel. The carrier is bolted to a torque frame, which is secured to fixed structure or rotating structure depending upon the particular type of gear system.

One type of gear system for helicopter applications has been used which directly supports the intermediate gears on an integrated carrier and torque frame. This integrated torque frame includes shafts that directly support the intermediate gears in a cantilevered fashion by conventional rolling element bearings. This arrangement is subjected to vibrational stresses that may cause the integrated torque frame to fail.

SUMMARY

In one exemplary embodiment, a fan gear drive system includes a fan shaft, a turbine shaft, a fixed structure, and a gear train which includes a torque frame that comprises a base with integrated gear shafts that are circumferentially spaced relative to one another. Each shaft provides a gear shaft axis. A central gear is located radially inward from and intermeshes with the intermediate gears. A ring gear is arranged about and intermeshes with the intermediate gears. One of the torque frame, central gear and ring gear is connected to the fan shaft. Another of the torque frame, central gear and ring gear is connected to the turbine shaft. The remaining of the torque frame, central gear and ring gear is connected to the fixed structure. A bearing assembly is mounted on each of the gear shafts and provides a bearing axis. Each bearing assembly supports one of the respective intermediate gears.

In a further embodiment of the above, the bearing assembly includes a spherical bearing configured to permit angular movement of the bearing axis relative to the shaft axis.

In a further embodiment of any of the above, the bearing assembly includes a race that supports the respective intermediate gear. The spherical bearing is received by the race. A pin is configured to prevent relative rotation between the race, spherical bearing and the shaft about the shaft axis.

In a further embodiment of any of the above, the torque frame includes a first passage that is provided through the shaft and is configured to provide lubricating fluid to the intermediate gears. The bearing assembly includes at least one passageway that extends through each of the spherical bearing and the race and is in fluid communication with the passage.

In a further embodiment of any of the above, an oil baffle is supported by the torque frame and is in fluid communication with the passage. The oil baffle includes a second passage that is configured to receive lubricating fluid from an oil transfer assembly during rotation of the torque frame relative to the fixed structure.

In a further embodiment of any of the above, a tube fluidly connects the first and second passages. The oil baffle includes third and fourth passages respectively that fluidly connect to first and second spray bars.

In a further embodiment of any of the above, the first spray bar is provided in the oil baffle and is configured to direct lubricating fluid at the teeth of at least one of the input gear and the intermediate gears. The second spray bar is supported by the torque frame and is in fluid communication with a fifth passage in the torque frame that is in fluid communication with the fourth passage.

In a further embodiment of any of the above, the torque frame is constructed from a high strength metallic alloy. The oil baffle is constructed from a lower strength lighter weight alloy than the high strength metallic alloy.

In a further embodiment of any of the above, a turbine section is connected to the turbine shaft and is configured to drive the fan shaft through the gear train.

In a further embodiment of any of the above, the ring gear is grounded to the fixed structure.

In a further embodiment of any of the above, the torque frame is connected to the fan shaft.

In a further embodiment of any of the above, the turbine shaft is connected to the central gear.

In a further embodiment of any of the above, the ring gear is grounded to the fixed structure.

In a further embodiment of any of the above, the torque frame is connected to the fan shaft.

In another exemplary embodiment, a method of designing a fan gear drive system includes defining a fan shaft, defining a turbine shaft, defining a fixed structure and defining a gear train. A gear train is configured to include a torque frame including a base with integrated gear shafts configured to be circumferentially spaced relative to one another. Each gear shaft is configured to provide a gear shaft axis. A central gear is configured to be located radially inward from and intermeshing with intermediate gears. A ring gear is configured to be arranged about and intermeshing with the intermediate gears. One of the torque frame, central gear and ring gear is configured to be connected to the fan shaft. Another of the torque frame, central gear and ring gear is configured to be connected to the turbine shaft. The remaining of the torque frame, central gear and ring gear is configured to be connected to the fixed structure. A bearing assembly is configured to be mounted on each of the gear shafts and provide a bearing axis. Each bearing assembly is configured to support one of the respective intermediate gears.

In a further embodiment of the above, the bearing assembly is configured to include a spherical bearing that is configured to permit angular movement of the bearing axis relative to the shaft axis.

In a further embodiment of any of the above, the bearing assembly is configured to include a race that supports the respective intermediate gear. The spherical bearing is configured to be received by the race and comprises a pin that is configured to prevent relative rotation between the race, the spherical bearing and the shaft about the shaft axis.

In a further embodiment of any of the above, the torque frame is configured to include a first passage provided through the bearing shaft and is configured to provide lubricating fluid to the intermediate gears. The bearing assembly is configured to include at least one passageway that extends through each of the spherical bearing and the race and is in fluid communication with the passage.

In a further embodiment of any of the above, an oil baffle is configured to be supported by the torque frame and be in fluid communication with the passage. The oil baffle is configured to include a second passage that is configured to receive lubricating fluid from an oil transfer assembly during rotation of the torque frame relative to the fixed structure.

In a further embodiment of any of the above, a tube is configured to fluidly connect the first and second passages. The oil baffle is configured to include third and fourth passages respectively that fluidly connect to first and second spray bars.

In a further embodiment of any of the above, the first spray bar is configured to be provided in the oil baffle and is configured to direct lubricating fluid at teeth of at least one of the input gear and the intermediate gears. The second spray bar is configured to be supported by the torque frame and is in fluid communication with a fifth passage in the torque frame that is in fluid communication with the fourth passage.

In a further embodiment of any of the above, the torque frame is configured to be constructed from a high strength metallic alloy. The oil baffle is configured to be constructed from a lower strength lighter weight alloy than the high strength metallic alloy.

In a further embodiment of any of the above, a turbine section is configured to be connected to the turbine shaft and is configured to drive the fan shaft through the gear train.

In a further embodiment of any of the above, the ring gear is configured to be grounded to the fixed structure.

In a further embodiment of any of the above, the torque frame is configured to be connected to the fan shaft.

In a further embodiment of any of the above, the turbine shaft is configured to be connected to the central gear.

In a further embodiment of any of the above, the ring gear is configured to be grounded to the fixed structure.

In a further embodiment of any of the above, the torque frame is configured to be connected to the fan shaft.

BRIEF DESCRIPTION OF THE DRAWINGS

The disclosure can be further understood by reference to the following detailed description when considered in connection with the accompanying drawings wherein.

DETAILED DESCRIPTION

Figure 1:
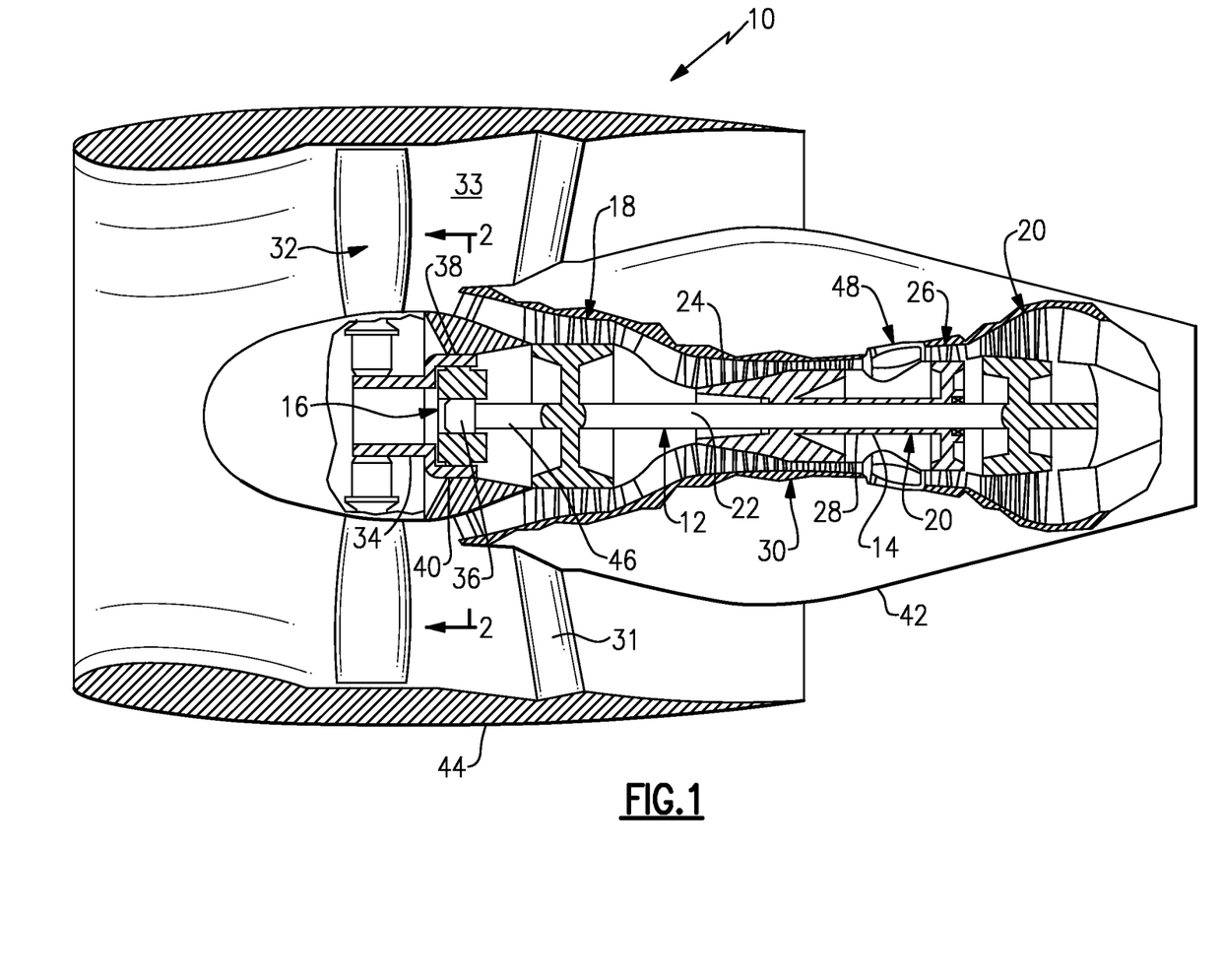
FIG. 1 is a schematic cross-sectional view of an example gas turbine engine.

An example gas turbine engine 10 is schematically illustrated in FIG. 1. The engine 10 includes turbo-machinery 30 having a compressor section 12 and a turbine section 14. The turbo-machinery 30 rotationally drives a fan 32, which is arranged in a bypass flow path 33, through an epicyclic gear train 16. The turbo-machinery 30 is housed within an inner nacelle 42. Flow exit guide vanes 31 arranged within the bypass flow path support the turbo-machinery 30 relative to a fan case, which is housed in a fan nacelle 44.

A low pressure compressor 18 and a low pressure turbine 20 are mounted on a low pressure spool 22. A high pressure compressor 24 and a high pressure turbine 26 are mounted on a high pressure spool 28. A combustor section 48 is arranged between the high pressure compressor 24 and the high pressure turbine 26.

The low pressure spool 22 rotationally drives a flex shaft 46 to which an input gear 36 (sun gear) is mounted for rotation about an axis A. Intermediate gears 38 (in the example, star gears) are arranged circumferentially about and intermesh with the input gear 36. A ring gear 40 surrounds and intermeshes with the intermediate gears 38. Either the intermediate gears 38 or the ring gear 40 rotationally drives the fan shaft 34 depending upon the type of epicyclic gear train configuration. A fan hub 35 is supported by and rotationally affixed to the fan shaft 34.

Figure 2:
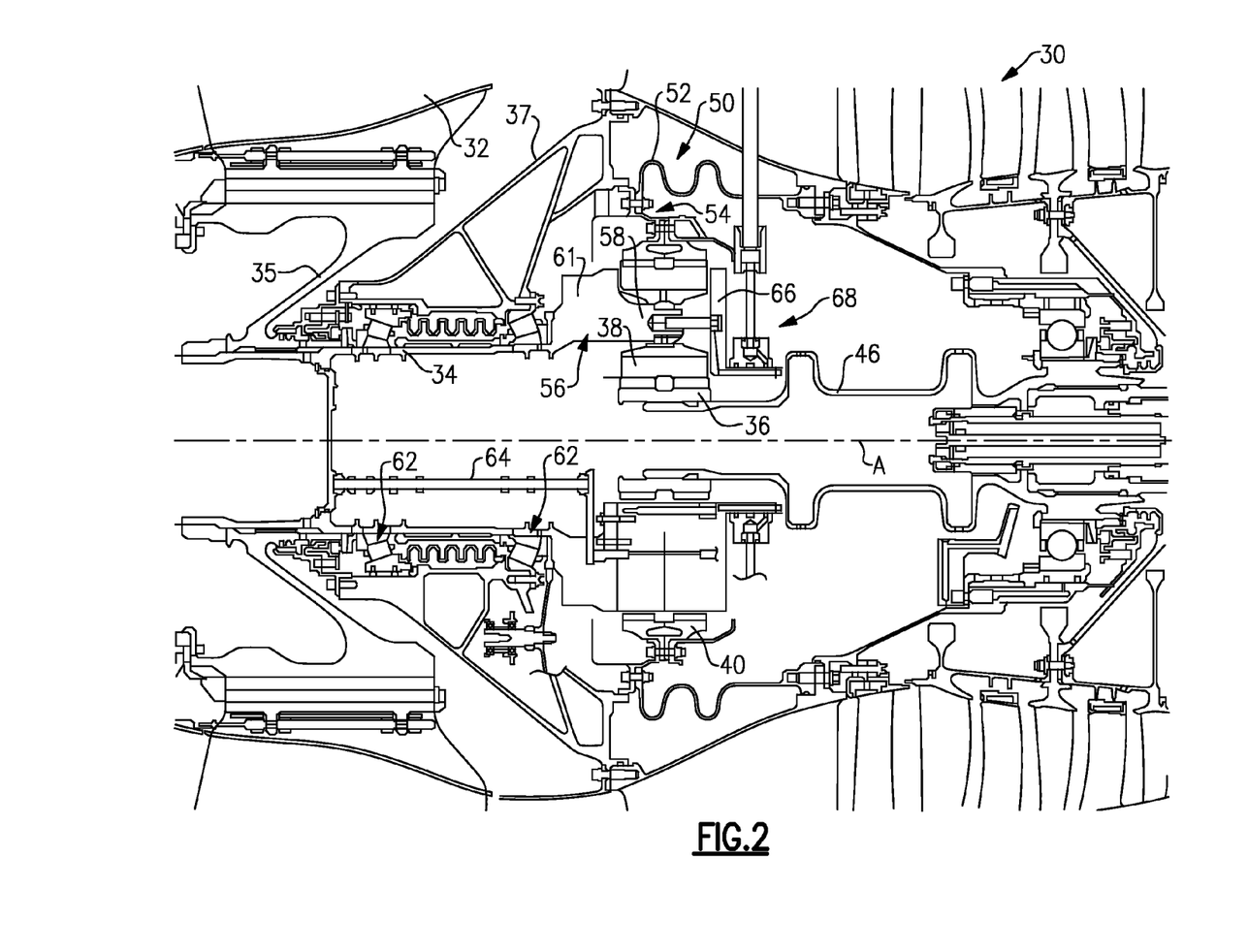
FIG. 2 is a cross-sectional view of an example fan drive gear system.

One example epicyclic gear train 16 is illustrated in FIG. 2. The epicyclic gear train 16 is the type in which the intermediate gears 38 (planet gears, in the example) rotate relative to the rotational axis of the input gear 36. That is, the planet gears are permitted to rotate about the rotational axis of the input gear 36. The turbo-machinery 30 includes fixed structure 50 comprising a bearing compartment case 52 and a ring gear support 54. A ring gear 40 is coupled to the ring gear support 54.

A torque frame 56 is integrated with the fan shaft 34 as a unitary structure. The torque frame 56 includes multiple shafts 58 integral with and extending from a base 61. In the example, the torque frame 56 includes five equally circumferentially spaced shafts 58 that correspondingly support five planet gears. The fan shaft 34, base 61 and shafts 58 of the torque frame 56 are unitary and formed by a one-piece structure, for example, by a forged steel structure. Other high strength metallic alloys, such titanium or nickel, may also be used.

Figure 3:
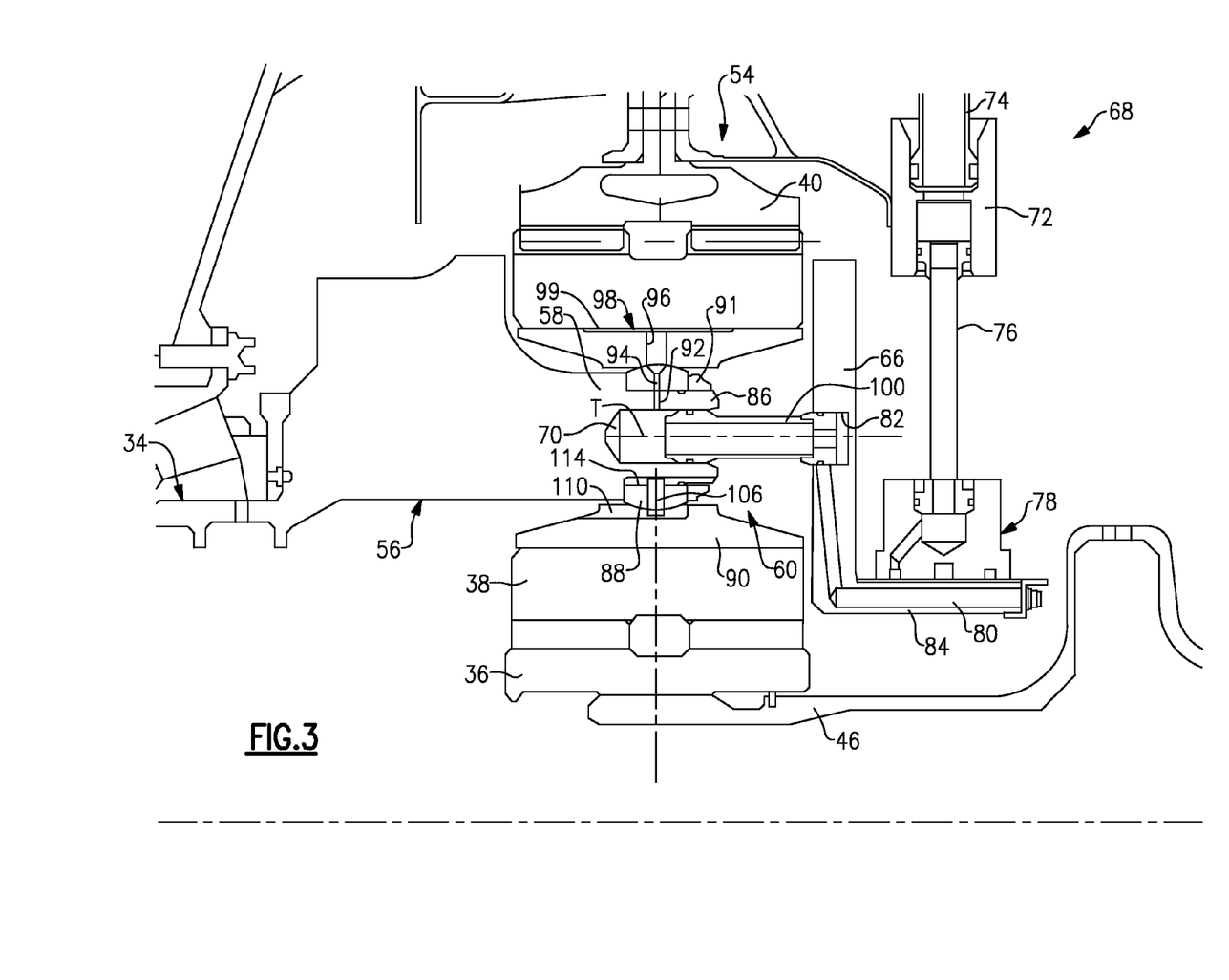
FIG. 3 is an enlarged cross-sectional view of a portion of the fan drive gear system illustrated in FIG. 2.
Figure 4:
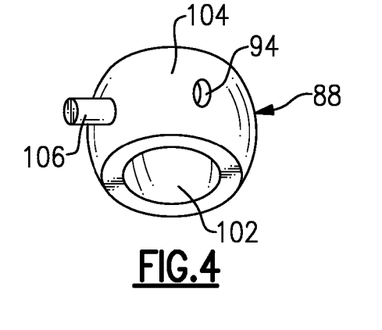
FIG. 4 is a perspective view of an example spherical bearing.

Referring to FIG. 3, the torque frame 56 includes oil passages to which oil must be transferred from the fixed structure 50 as the torque frame 56 rotates. For example, an oil passage 63 provides lubricating fluid to a spray bar 64 that delivers oil to output shaft bearings 62, which is supported by a front bearing housing 37. An oil transfer assembly 68 includes a transfer bearing 78 that is fixed and which mates to an oil baffle 66 that is secured to the rotating torque frame 56. A union 72 is affixed to the ring gear support 54 and receives lubricating fluid from a first transfer tube 74 that extends through the bearing compartment case 52. A second transfer tube 76 fluidly connects the union 72 to the transfer bearing 78, which is sealed to a collar 84 on the oil baffle 66.

The oil baffle 66 includes a passage 80 that conveys lubricating fluid to an aperture 82 that is aligned with each shaft 58. A tube 100 fluidly connects the aperture 82 to a passage 70 in the shaft 58.

Each shaft 58 includes a bearing assembly 60 for rotationally supporting its respective intermediate gear 38. The oil baffle 66 is secured to the torque frame 56 by fasteners 74. The oil baffle 66 is non-structural. That is, the oil baffle does not support the loads of the intermediate gears 38 as would a prior art carrier. As a result, the oil baffle 66 may be constructed from a considerably lower strength lighter weight material, such as an aluminum alloy or composite material.

Referring to FIG. 3, each shaft 58 includes an end 86 that supports a bearing assembly 60. The bearing assembly 60 includes a spherical bearing 88 supported in a race 90 on which the intermediate gear 38 is mounted. The ends 86 include a threaded portion that each receives a nut 91 securing the bearing assembly 60 to the shaft 58. The shaft 58, spherical bearing 88 and race 90 respectively include radially extending first, second and third passageways 92, 94, 96 that are aligned with one another to deliver lubricating fluid from the first passage 70 to bearing surfaces 98 provided between the race 90 and the intermediate gear 38. A recess 99 is provided in an outer diameter of the race 90 to increase lubrication at the bearing surfaces 98. In one example, the tube 100 includes a filter is arranged in a hole in the shaft 58 that provides a portion of the first passage 70.

Figure 5A:
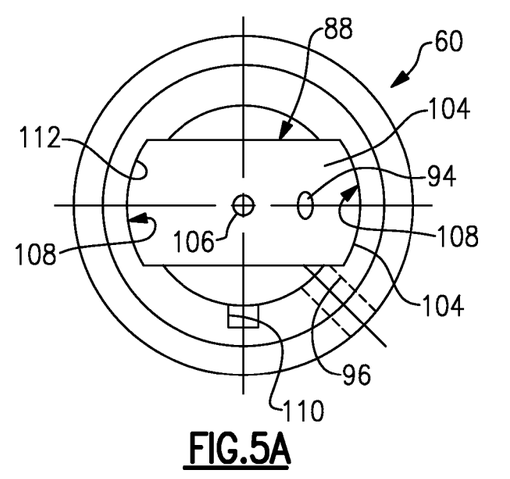
FIG. 5A is an elevational view of the spherical bearing of FIG. 4 inserted into a race in an assembly position.
Figure 5B:
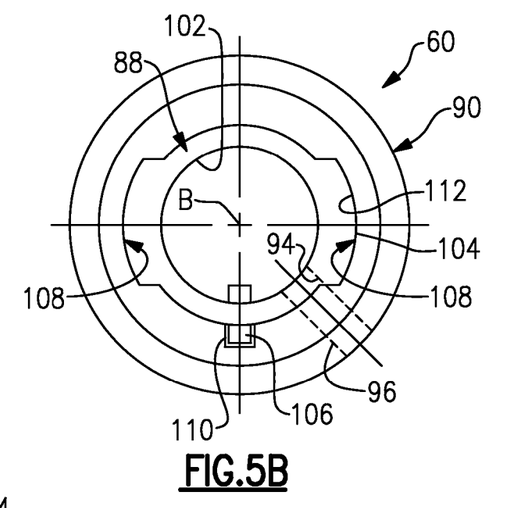
FIG. 5B is an elevational view of the spherical bearing of FIG. 4 fully assembled into the race to provide a bearing assembly.

Referring to FIGS. 3-5B, the spherical bearing 88 includes an inner diameter 102 that is supported by the end 86. A convex surface 104 is provided on an outside of the spherical bearing 88 and mates with a corresponding concave surface 112 provided by an inner surface of the race 90 when fully assembled as illustrated in FIG. 5B. The spherical bearing 88 includes a pin 106 that extends through both the inner diameter 102 and the convex surface 104 in the example illustrated. The pin 106 is received by notches 110, 114 respectively provided in the race 90 and end 86 to prevent rotation of the spherical bearing 88 about a bearing axis B (FIG. 5B). The spherical bearing 88 permits angular movement of the bearing axis B relative to a shaft axis T (FIG. 3) provided by the shaft 58 during flexing of the shafts 58, which provides a near zero moment restraint.

FIGS. 5A and 5B illustrate the assembly process of the bearing assembly 60. The spherical bearing 88 is inserted into slots 108 of the race 90, as shown in FIG. 5A. The pin 106 is aligned with the notch 110 and the spherical bearing 88 is rotated to snap into engagement with the concave surface 112 with the pin 106 received in the notch 110. In this position, illustrated in FIG. 5B, the second and third passageways 94, 96 are aligned with one another.

Figure 6:
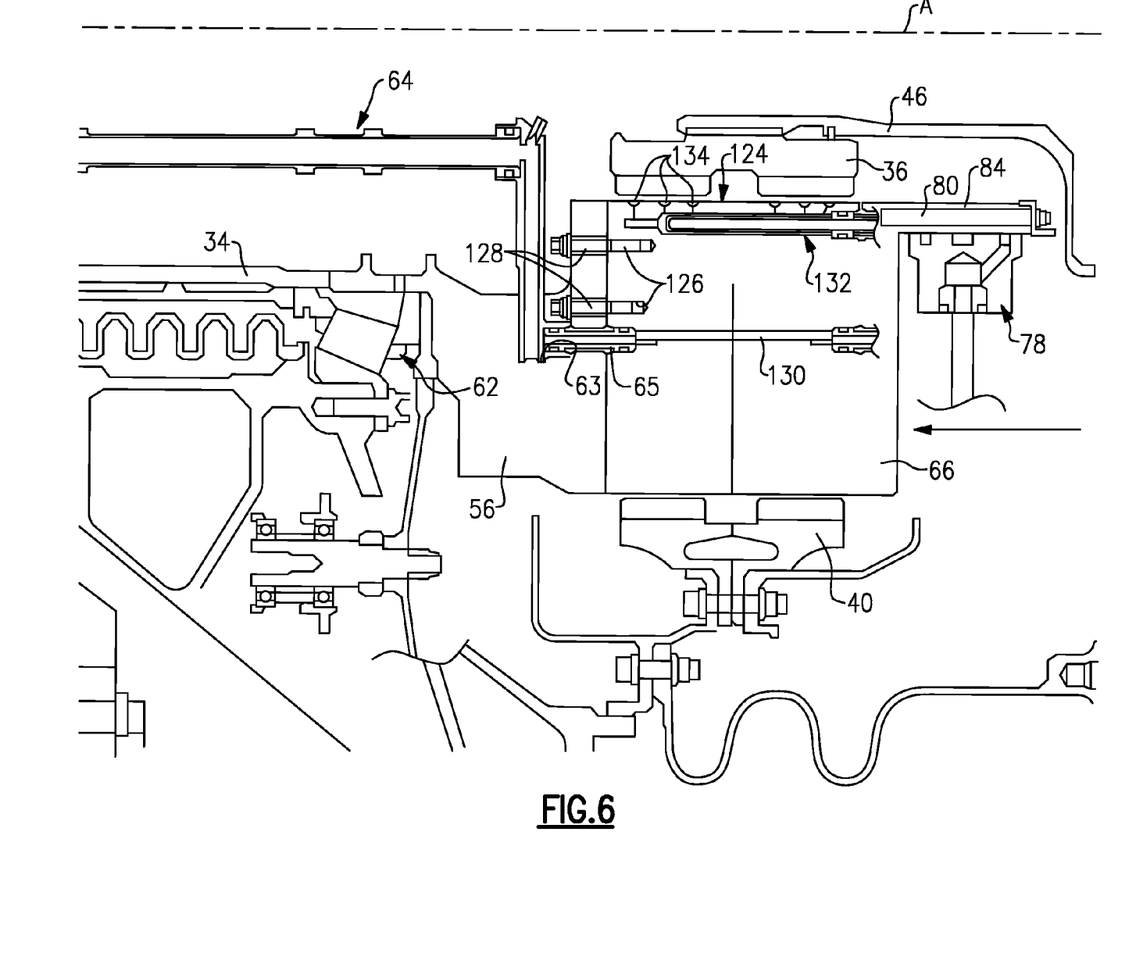
FIG. 6 is an enlarged cross-sectional view of another portion of the fan drive gear system illustrated in FIG. 2.

Both the torque frame 56 and the oil baffle 66 provide internal lubrication features for supplying lubricating fluid, such as oil, to the gears of the epicyclic gear train 16. Referring to FIG. 6, the passage 80 in the oil baffle 66 provides lubricating fluid to first and second passageways 130, 132. The first passageway 130 is fluidly connected to an oil passage 63 in the torque frame 56 via a tube 65. The first passageway 130 delivers oil to the spray bar 64. The second passageway 132 delivers lubricating fluid to a spray bar, which includes spray nozzles 134, provided integrally in the oil baffle 66. The second passageway 132 extends in a generally axial direction in the example shown, and the one or more spray nozzles 134 are transverse to the second passageway 132. In the example, the spray nozzles 134 are oriented to direct lubricating fluid radially inward at teeth 84 of the input gear 36.

Figure 7:
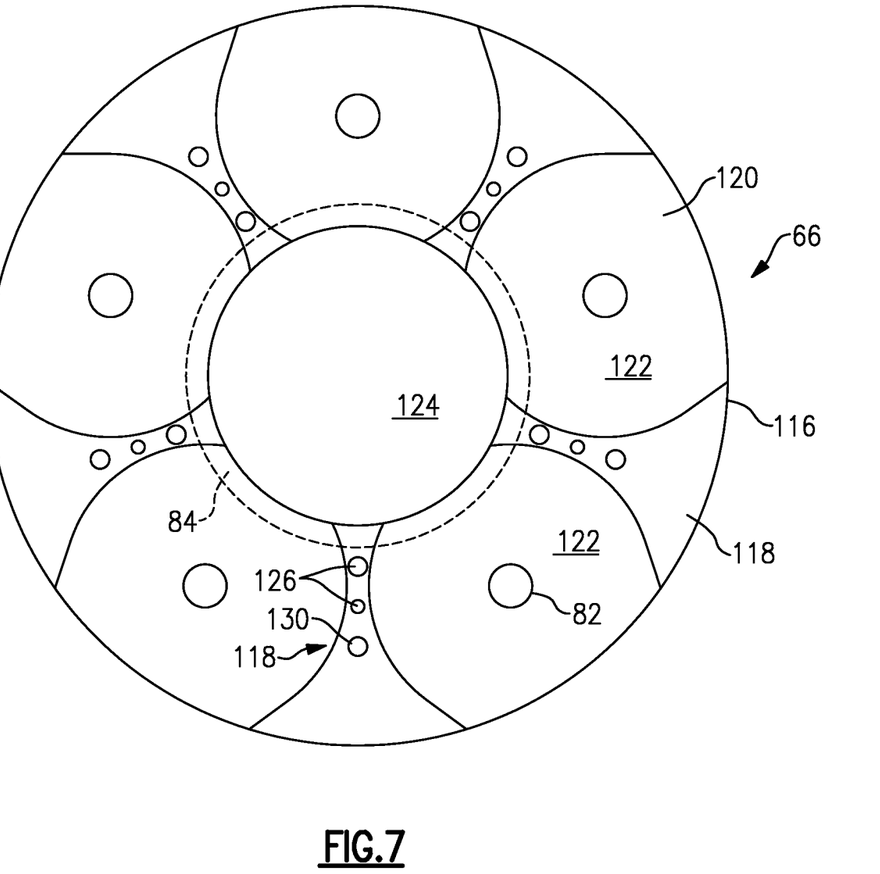
FIG. 7 is an elevational view of an example oil baffle used in the fan drive gear system and illustrated in FIGS. 2 and 3.

The oil baffle 66 is illustrated in more detail in FIGS. 6 and 7. The oil baffle 66 is provided by a body 116 having circumferentially spaced apart intermediate structures 118 axially extending from a wall 120. The intermediate structures 118 include the first passageway 130. The intermediate structures 118 define gear pockets 122 within which the intermediate gears 38 are received with the epicyclic gear train 16 fully assembled. Each gear pocket 122 includes the aperture 82 provided in the wall 120. The input gear 36 is received in a central opening 124 provided radially inward of the intermediate structures 118. Holes 126 are provided in the intermediate structures 118 and receive fasteners 128 to secure the oil baffle 66 to the torque frame 56, as illustrated in FIG. 6.

The epicyclic gear train 16 is assembled by first installing the fixed structure into the bearing compartment case 52, such as the oil transfer assembly 68 and the ring gear 40. The input gear 36 is supported on the flex shaft 46. The intermediate gears 38 are mounted on the torque frame 56, and the fan shaft 34 is rotationally mounted in the front bearing housing 37 by bearings 62. The torque frame 56, with its intermediate gears 38, is inserted between the input gear 36 and the ring gear 40 such that the gears intermesh with one another. The front bearing housing 37 is secured to the fixed structure 50. The fan hub 35 is slid onto and secured to the fan shaft 34.

Although an example embodiment has been disclosed, a worker of ordinary skill in this art would recognize that certain modifications would come within the scope of the claims. For that reason, the following claims should be studied to determine their true scope and content.

What is claimed is:

1. A fan gear drive system comprising:
   a fan shaft;
   a turbine shaft;
   a fixed structure; and
   a gear train including:
      a torque frame comprising a base with integrated gear shafts circumferentially spaced relative to one another, and each gear shaft providing a gear shaft axis,
      a central gear located radially inward from and intermeshing with intermediate gears, each intermediate gear mounted on a respective gear shaft and configured to rotate about its respective gear shaft axis,
      a ring gear arranged about and intermeshing with the intermediate gears, and
      wherein one of the torque frame, central gear and ring gear is connected to the fan shaft, another of the torque frame, central gear and ring gear is connected to the turbine shaft, and a remaining of the torque frame, central gear and ring gear is connected to the fixed structure; and
      a bearing assembly is mounted on each of the gear shafts and provides a bearing axis, each bearing assembly supports one of the respective intermediate gears.

2. The system according to claim 1, wherein the bearing assembly includes a spherical bearing configured to permit angular movement of the bearing axis relative to the shaft axis.

3. The system according to claim 2, wherein the bearing assembly includes a race supporting the respective intermediate gear, and the spherical bearing is received by the race, and comprising a pin configured to prevent relative rotation between the race, the spherical bearing and the shaft about the shaft axis.

4. The system according to claim 2, wherein the torque frame includes a first passage provided through the bearing shaft and configured to provide lubricating fluid to the intermediate gears, and the bearing assembly includes at least one passageway extending through each of the spherical bearing and the race and in fluid communication with the passage.

5. The system according to claim 4, comprising an oil baffle supported by the torque frame and in fluid communication with the passage, the oil baffle includes a second passage configured to receive lubricating fluid from an oil transfer assembly during rotation of the torque frame relative to the fixed structure.

6. The system according to claim 5, comprising a tube fluidly connecting the first and second passages, and the oil baffle including third and fourth passages respectively fluidly connecting to first and second spray bars.

7. The system according to claim 6, wherein the first spray bar is provided in the oil baffle and configured to direct lubricating fluid at teeth of at least one of the input gear and the intermediate gears, and the second spray bar is supported by the torque frame and in fluid communication with a fifth passage in the torque frame that is in fluid communication with the fourth passage.

8. The system according to claim 5, wherein the torque frame is constructed from a high strength metallic alloy, and the oil baffle is constructed from a lower strength lighter weight alloy than the high strength metallic alloy.

9. The system according to claim 1, comprising a turbine section connected to the turbine shaft and is configured to drive the fan shaft through the gear train.

10. The system according to claim 9, wherein the ring gear is grounded to the fixed structure.

11. The system according to claim 10, wherein the torque frame is connected to the fan shaft.

12. The system according to claim 9, wherein the turbine shaft is connected to the central gear.

13. The system according to claim 12, wherein the ring gear is grounded to the fixed structure.

14. The system according to claim 9, wherein the torque frame is connected to the fan shaft.

15. A method of designing a fan gear drive system comprising:
 defining a fan shaft;
 defining a turbine shaft;
 defining a fixed structure; and
 defining a gear train configured to include:
  a torque frame comprising a base with integrated gear shafts configured to be circumferentially spaced relative to one another, and each gear shaft configured to provide a gear shaft axis,
  a central gear configured to be located radially inward from and intermeshing with intermediate gears, each intermediate gear mounted on a respective gear shaft and configured to rotate about its respective gear shaft axis,
  a ring gear configured to be arranged about and intermeshing with the intermediate gears, and
  wherein one of the torque frame, central gear and ring gear is configured to be connected to the fan shaft, another of the torque frame, central gear and ring gear is configured to be connected to the turbine shaft, and a remaining of the torque frame, central gear and ring gear is configured to be connected to the fixed structure; and
  a bearing assembly is configured to be mounted on each of the gear shafts and provide a bearing axis, each bearing assembly configured to support one of the respective intermediate gears.

16. The method according to claim 15, wherein the bearing assembly is configured to include a spherical bearing configured to permit angular movement of the bearing axis relative to the shaft axis.

17. The method according to claim 16, wherein the bearing assembly is configured to include a race supporting the respective intermediate gear, and the spherical bearing is configured to be received by the race, and comprising a pin configured to prevent relative rotation between the race, the spherical bearing and the shaft about the shaft axis.

18. The method according to claim 16, wherein the torque frame is configured to include a first passage provided through the bearing shaft and configured to provide lubricating fluid to the intermediate gears, and the bearing assembly is configured to include at least one passageway extending through each of the spherical bearing and the race and in fluid communication with the passage.

19. The method according to claim 18, comprising defining an oil baffle configured to be supported by the torque frame and in fluid communication with the passage, the oil baffle is configured to include a second passage configured to receive lubricating fluid from an oil transfer assembly during rotation of the torque frame relative to the fixed structure.

20. The method according to claim 19, comprising defining a tube configured to be fluidly connecting the first and second passages, and the oil baffle is configured to include third and fourth passages respectively fluidly connecting to first and second spray bars.

21. The method according to claim 20, wherein the first spray bar is configured to be provided in the oil baffle and configured to direct lubricating fluid at teeth of at least one of the input gear and the intermediate gears, and the second spray bar is configured to be supported by the torque frame and in fluid communication with a fifth passage in the torque frame that is in fluid communication with the fourth passage.

22. The method according to claim 19, wherein the torque frame is configured to be constructed from a high strength metallic alloy, and the oil baffle is configured to be constructed from a lower strength lighter weight alloy than the high strength metallic alloy.

23. The method according to claim 15, comprising defining a turbine section configured to be connected to the turbine shaft and configured to drive the fan shaft through the gear train.

24. The method according to claim 23, wherein the ring gear is configured to be grounded to the fixed structure.

25. The method according to claim 24, wherein the torque frame is configured to be connected to the fan shaft.

26. The method according to claim 23, wherein the turbine shaft is configured to be connected to the central gear.

27. The method according to claim 26, wherein the ring gear is configured to be grounded to the fixed structure.

28. The method according to claim 23, wherein the torque frame is configured to be connected to the fan shaft.

* * * * *